(12) United States Patent
Tollefson

(10) Patent No.: US 7,092,427 B1
(45) Date of Patent: Aug. 15, 2006

(54) DIRECT SEQUENCE MODULATION USING TIME, FREQUENCY, AND/OR ON-OFF KEYING

(75) Inventor: William G. Tollefson, Cedar Rapids, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 816 days.

(21) Appl. No.: 09/862,130

(22) Filed: May 21, 2001

(51) Int. Cl.
H04B 15/00 (2006.01)
H04K 1/00 (2006.01)
H04L 27/30 (2006.01)

(52) U.S. Cl. .................................... 375/132; 375/140
(58) Field of Classification Search ........ 375/130–153, 375/259, 295
See application file for complete search history.

(56) References Cited

U.S. PATENT DOCUMENTS

| | | | | |
|---|---|---|---|---|
| 4,320,361 A | * | 3/1982 | Kikkert | 332/112 |
| 5,131,006 A | * | 7/1992 | Kamerman et al. | 375/130 |
| 5,440,636 A | * | 8/1995 | Herrick | 380/34 |
| 5,625,639 A | * | 4/1997 | Tomita et al. | 375/146 |
| 5,825,807 A | * | 10/1998 | Kumar | 375/130 |
| 2003/0156603 A1 | * | 8/2003 | Rakib et al. | 370/485 |

* cited by examiner

*Primary Examiner*—Jean B Corrielus
(74) *Attorney, Agent, or Firm*—Nathan O. Jensen; Kyle Eppele

(57) ABSTRACT

A pair of radio frequency communication devices and a communication method are provided according to the invention. A transmitter includes a data source providing a data stream and a radio frequency modulation device. The radio frequency modulation device communicates with the data source and performs a modulation of a carrier wave according to the data stream provided by the data source. The data stream controls one or more modulation characteristics of the carrier wave. A corresponding receiver includes a modulation key and a modulation detector. The modulation key includes a plurality of modulation patterns. The modulation detector receives a radio frequency communication signal and communicates with the modulation key. The modulation detector maps portions of the received communication signal to the modulation key in order to detect modulation characteristics in the received communication signal and to generate a data output.

6 Claims, 3 Drawing Sheets

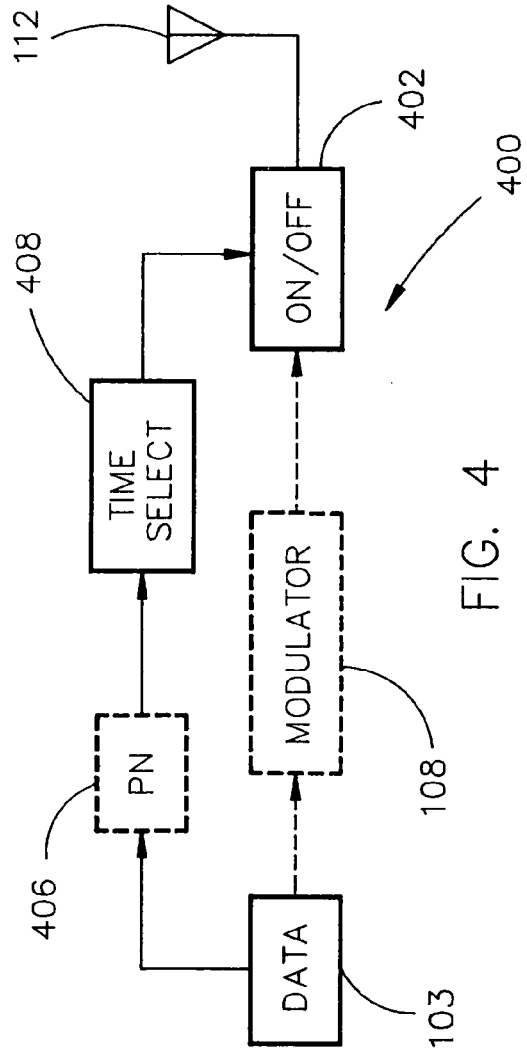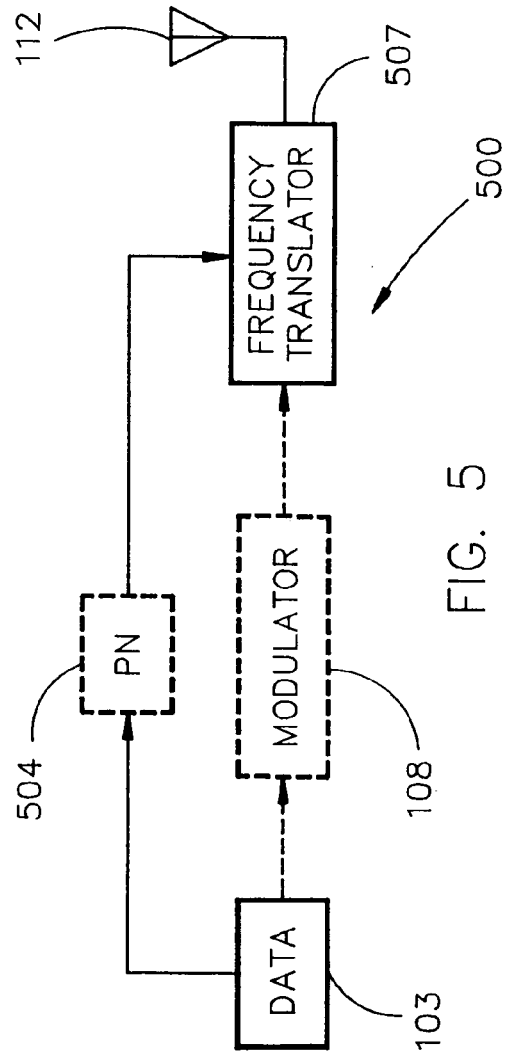

DIRECT SEQUENCE MODULATION USING TIME, FREQUENCY, AND/OR ON-OFF KEYING

FIELD OF THE INVENTION

The U.S. Government has a paid-up license in this invention and the right in limited circumstances to require the patent owner to license others on reasonable terms as provided for by the terms of the contract number N00019-96-D-0159 awarded by the United States Navy.

The present invention relates generally to a radio frequency communication device, and more particularly to a radio frequency communication device that employs one or more variable modulation characteristics.

BACKGROUND OF THE INVENTION

Direct sequence modulation is a type of radio frequency modulation wherein a data stream is spread by a higher rate bit stream prior to modulation. A prior art direct sequence modulation transmitter includes a radiation device (antenna), a modulator or demodulator, and a data stream generator. In addition, a prior art transmitter generally includes a modulation key generator that is used to control the modulation characteristics of a radio frequency (RF) signal.

Direct sequence modulation is widely used in order to enhance security and to minimize interference and noise. A spread spectrum transmitter can transmit in such a way as to minimize transmission power and interference and maximize data security. As a result, a direct sequence modulation communication system often includes security features such as encryption, frequency hopping, and time hopping. Furthermore, the direct sequence modulation communication system often mixes an input data stream with a pseudorandom noise (PN) stream in order to spread out the signal bandwidth and decrease the signal to noise ratio. This is commonly done in order to make the signal indistinguishable from background noise in order to hide it from potential eavesdroppers. As a result, a transmission may advantageously have reduced interference and noise vulnerability and increased security as the data stream may be spread over a larger instantaneous bandwidth and/or over a range of frequencies. This makes the signal hard to intercept or jam.

A prior art communication device operates by generating a modulation key that controls one or more RF modulation characteristics. The prior art modulation key is supplied to the transmitter, along with the data stream input. The transmitter modulates the data stream onto a carrier wave according to the modulation characteristics of the modulation key. The prior art receiver also includes a modulation key generator, and demodulates a received RF signal according to the same modulation characteristics.

The drawback of the direct sequence modulation of the prior art is the requirement of a modulation key generator in the transmitter and receiver. The modulation key generator consumes extra electrical power and requires extra circuitry, extra complexity, extra weight, extra size, and extra cost. These are typically concerns in direct sequence modulation transmitters, and especially in portable communication devices and satellite-based communication devices.

What is needed, therefore, are improvements in such communication devices.

SUMMARY OF THE INVENTION

A radio frequency communication device is provided according to one embodiment of the invention, wherein the radio frequency communication device comprises a data source providing a data stream and a radio frequency modulation device. The radio frequency modulation device communicates with the data source and performs a modulation of a carrier wave according to the data stream provided by the data source. The data stream controls one or more modulation characteristics of the carrier wave.

A radio frequency communication device is provided according to another embodiment of the invention. The communication device comprises a modulation key and a modulation detector. The modulation key includes a plurality of modulation patterns. The modulation detector receives a radio frequency communication signal and communicates with the modulation key. The modulation detector maps portions of the received communication signal to the modulation key in order to detect modulation characteristics in the received communication signal and to generate a data output.

A radio frequency modulation method is provided according to a further embodiment of the invention, wherein the radio frequency modulation method comprises the steps of providing a radio frequency modulator capable of modulating or de-modulating a radio frequency signal, providing a data stream, and controlling one or more modulation characteristics according to the data stream.

The above and other features and advantages of the present invention will be further understood from the following description of the preferred embodiments thereof, taken in conjunction with the accompanying drawings.

BRIEF DESCRIPTION OF THE DRAWINGS

FIG. 4 shows a transmitter communication device according to a third embodiment that implements an on/off state carrier wave modulation;

FIG. 5 shows a transmitter communication device according to a fourth embodiment that implements a carrier wave frequency selection.

DETAILED DESCRIPTION

Figure 1:
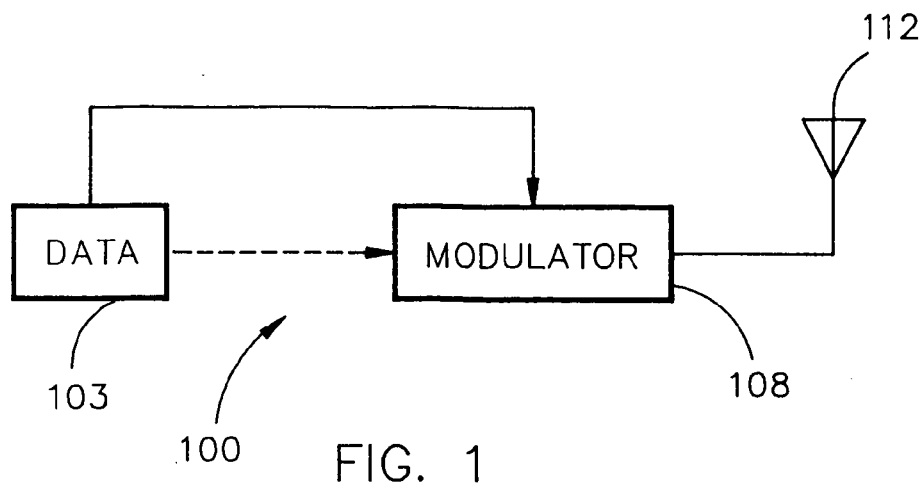
FIG. 1 shows a radio frequency communication device according to one embodiment of the invention.

FIG. 1 shows a radio frequency (RF) communication device 100 according to one embodiment of the invention. In this embodiment, the radio frequency communication device 100 comprises a data stream generator 103, a radio frequency modulation device 108 (i.e., a modulator), and an antenna 112 or other radiation device. In this first embodiment, a data stream created by the data stream generator 103 is supplied to the modulator 108 (solid line) to control the modulation characteristics of the radio frequency communication device 100. The data outputted by the data stream generator 103 may be used to control one or more variable modulation characteristics of the radio frequency communication device 100. The modulation characteristics may include a carrier wave spreading pattern, an on/off state of the carrier wave, or a frequency selection of the carrier wave, for example. According to the invention, information is encoded onto the carrier by changing the modulation characteristics of the modulator as opposed to modulating the carrier with the data stream. Optionally, the data stream may also be modulated onto the carrier wave.

The radio frequency communication device 100 and its various embodiments may perform all types of FSK (frequency shift keying) and PSK (phase shift keying) data modulation. This is possible because the modulator is able to modulate the carrier frequency, the carrier wave spreading pattern and the carrier on/off state. In addition, although the discussion centers around direct sequence modulation communication devices, it should be understood that the invention may apply to any radio frequency communication device.

The block diagram shows the basic main components of the radio frequency communication device 100 for the purpose of explaining the invention. It should be understood, however, that the radio frequency communication device 100 would also include other common radio frequency communication blocks, such as any type of amplification, signal processing, filtering, etc., as is known in the art.

The figure shows a dashed line from the data stream generator 103 to the modulator 108, which signifies that the data stream optionally may be modulated onto the carrier wave. As a result, the RF signal produced by the communication device 100 may include data modulated onto the carrier wave and may further include data that is encoded according to the particular modulation characteristics. However, even if the data stream is not modulated onto a carrier wave, the modulation characteristics may independently symbolize a data stream that may be decoded in a receiving device.

In the carrier wave spreading pattern modulation, the carrier wave spreading pattern controls the modulation of the encoded data (if there is any) onto the carrier wave. Specific spreading patterns may correspond to predetermined data bits or data bit patterns, with the data stream therefore controlling the carrier wave spreading. As a result, the data stream itself controls how the data stream is spread over time. For example, a segment of five kilohertz (kHz) data may be spread over a 50 kHz bandwidth using a spreading pattern selected by the data stream. The spreading pattern may be selected for purposes of noise immunity, security and encryption, etc.

In the on/off state modulation, the data stream from the data stream generator 103 may select the on/off time periods (states) of the carrier wave. For example, the carrier wave generated by the modulator 108 may be turned on and off in order to generate burst transmissions at substantially random times. The on and off carrier wave states may correspond to predetermined data bits or data bit patterns, with the data stream therefore controlling the carrier wave on/off states.

The third modulation characteristic that may be controlled by the data stream is the frequency selection of the carrier wave. This is commonly termed frequency hopping. Specific frequencies may correspond to predetermined data bits or data bit patterns, with the data stream therefore controlling the carrier wave frequency. This imparts an unprecedented level of randomness and unpredictability to a transmission, as the randomness of a transmission may be controlled by the contents of a varying and unpredictable data stream, and not on a predetermined fixed pattern.

The radio frequency communication device 100 of the invention differs from the prior art in that the data stream is used to pseudorandomly vary the physical characteristics of the transmission, rather than using an independent pseudorandom noise stream and pseudorandom noise stream generator. This simplifies transmitter and receiver design, making the transmitter and/or receiver simpler, less complex, less costly, and using less circuitry. In addition, it may result in a smaller transmitter or receiver device size and weight. Furthermore, a radio frequency transmitter receiver device according to the invention can maintain security features without separate data and modulation key generators. The benefits according to the invention are greatest when the data stream is used merely to vary the modulation characteristics of the carrier wave and the data stream is not modulated onto the carrier wave.

The data stream generator 103 may include optional pre-modulation conditioning processes. In one conditioning process, the data stream may be mixed with a pseudorandom noise (PN) stream to achieve a low signal to noise (S/N) ratio. The PN stream spreads energy within a time period that may convert an X bits per second data stream into a 10X bits per second data stream—more bits in the same time interval. The noise may help to hide the data signal (i.e., direct sequence spreading).

A second type of optional pre-modulation conditioning that may be included in the data stream generator 103 is encryption of the data stream. This may take the form of coding or other methods known in the art. The encryption may include the pseudorandom noise mixing, as the encryption process may create a PN-type data stream.

A third type of optional pre-modulation conditioning is error correction processing that may add extra data bits to the data stream for purposes of error detection and/or correction. One such type of error correction processing is a forward error correction (FEC) algorithm, for example.

A fourth type of optional pre-modulation conditioning is interleaving. The interleaving process shuffles the order of the data or data frames in order to randomize the data somewhat and obtain at least a partial randomization of the data.

Table 1 shows one example of a data symbol set that may be used to select modulation characteristics. For example, in a data stream employing a six bit data symbol, various bits or bit combinations may be used to choose a frequency, to choose a spreading pattern, and to choose an on/off carrier wave state.

TABLE 1

| Data Symbol | Frequency Component | Direct Sequence Component | Time Component |
| --- | --- | --- | --- |
| 000000 | tune to unexpected frequency | don't care | don't care (or turn off) |
| 000001 | tune to expected frequency | spreading sequence #1 | on/off pattern #1 |
| \| | | | |
| \| | | | |
| \| | | | |
| 111111 | tune to expected frequency | spreading sequence #7 | on/off pattern #9 |

The radio frequency communication device 100 may be a transmitter, but alternately may be a receiver. As discussed above, if the demodulation is successful, the demodulation characteristics alone may contain data and there may not even need to be a modulated data stream riding on the carrier wave (i.e., the carrier wave modulation characteristics themselves may represent encoded data).

Figure 2:
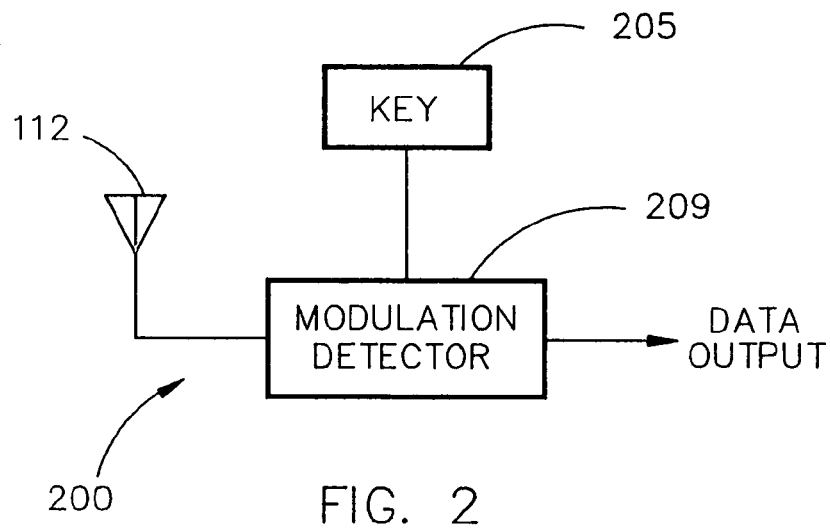
FIG. 2 shows a corresponding receiver.

FIG. 2 shows a corresponding receiver 200. The receiver 200 includes an antenna 112, a modulation detector 209, and a modulation key 205. The modulation key 205 may be a modulation key generator, a modulation key table, etc. The modulation key 205 includes a plurality of modulation patterns and reflects the possible key values or symbols within the data stream of a transmitter, and therefore also within a received signal. For example, the modulation key 205 may be a key table similar to table 1.

A data output may be generated from a received signal using the modulation key 205. Modulation characteristics of portions of the received signal are mapped or compared to the modulation key 205 in order to detect the signal and recreate the data stream (the data stream was used to control the modulation characteristics at the transmitter). Therefore, the receiver 200 maps portions of the received signal to the modulation key 205 in order to detect modulation characteristics in the received signal and to generate the data output. The portions must match the portions employed in the corresponding transmitter.

Unlike the prior art, the receiver 200 according to the invention does not need to demodulate the received signal in order to detect the data output that is encoded into the signal. The receiver 200 may generate the data output merely by detecting the modulation characteristics of the received signal. Therefore, by controlling the modulation characteristics, the data stream may be communicated between a transmitter and receiver according to the invention by modulating the carrier wave frequency, the carrier wave spreading pattern, and the carrier wave on/off state. The resulting receiver 200 (and transmitter) is simpler, cheaper, lighter, and less complex than prior art devices employing modulators and demodulators.

Figure 3:
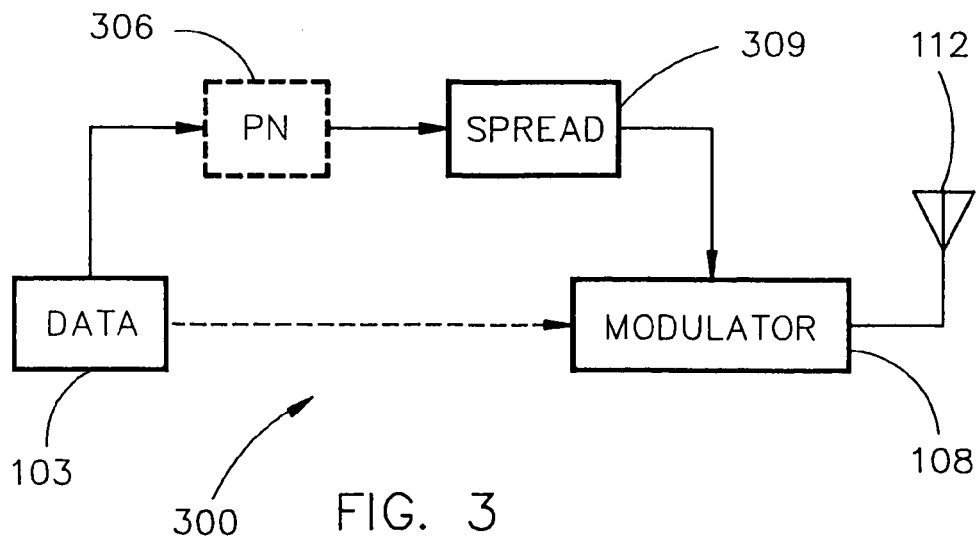
FIG. 3 shows a transmitter communication device according to a second embodiment that includes a carrier wave spreading pattern embodiment.

FIG. 3 shows a second transmitter communication device 300 according to the invention that includes a carrier wave spreading pattern. In addition to the basic blocks of FIG. 1, the device 300 includes an optional pseudorandom noise block 306 and a spreading block 309. The pseudorandom noise block 306 mixes the data stream from the data stream generator 103 with a pseudorandom noise sequence. A pseudorandom noise sequence typically comprises a predetermined number of bits of pseudorandom data arranged according to a predetermined sequence. The spreading block 309 controls the modulation characteristics of the modulator 108 in order to spread the data stream over time.

FIG. 4 shows a third transmitter communication device 400 according to the invention that implements an on/off state carrier wave modulation. In addition to the basic blocks of FIG. 1, the device 400 includes an optional pseudorandom noise block 406, a time select block 408, and an on/off block 402. In this embodiment, the data stream is used to control the on/off state characteristics of the carrier wave. The time select block 408 may recognize predetermined bits or bit patterns in the data stream and control the on/off block 402 to switch the carrier wave between on and off states.

FIG. 5 shows a fourth transmitter communication device 500 that implements a carrier wave frequency selection. In addition to the basic blocks of FIG. 1, this embodiment includes an optional pseudorandom noise block 504 and a frequency translator 507. The frequency translator 507 may be an analog mixer or a digital frequency synthesizer, for example. The frequency translator 507 receives the data stream and may be used to select a carrier frequency. For example, the frequency translator 507 may implement a frequency hopping algorithm with the data stream generator 103 able to select between two or more carrier frequencies. The frequency translator 507 may therefore recognize predetermined bits or bit patterns in the data stream and select between two or more predetermined carrier wave frequencies.

Figure 6:
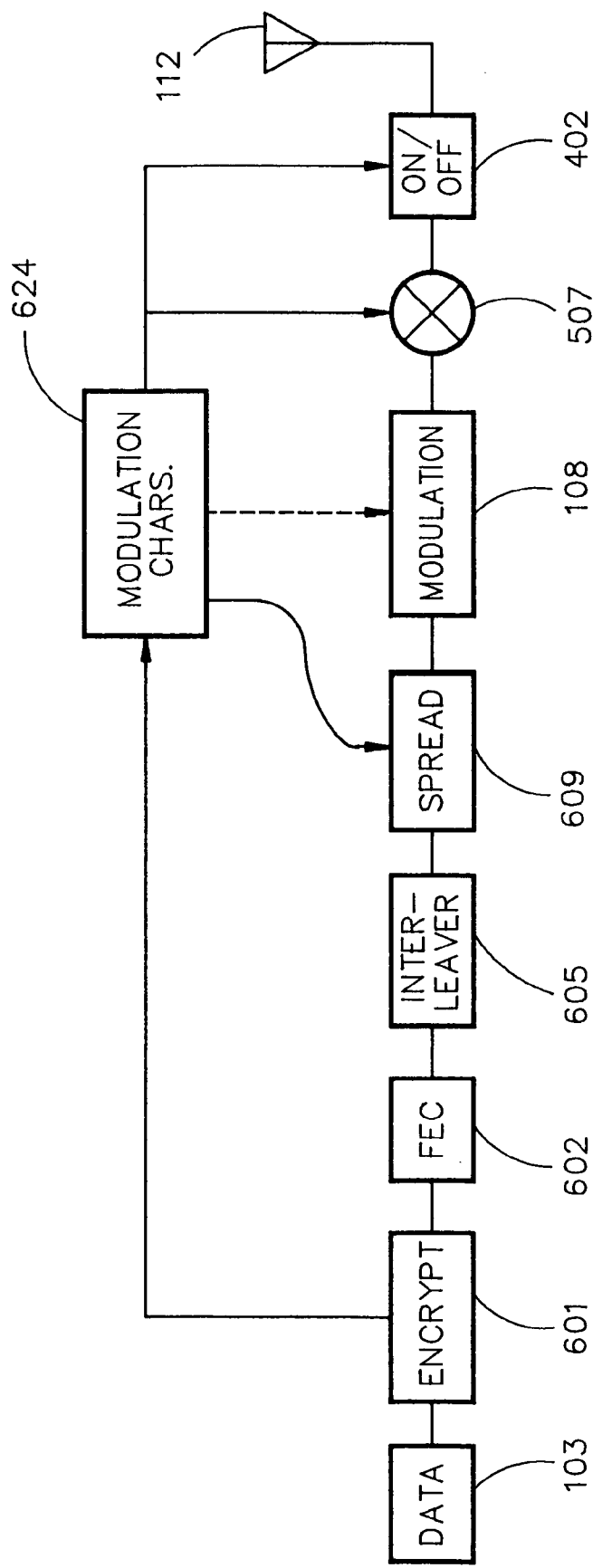
FIG. 6 shows a transmitter communication device according to a fifth embodiment.

FIG. 6 shows a fifth transmitter communication device 600. The communication device 600 includes the data stream generator 103, an encryption block 601, a forward error control (FEC) block 602, an interleaver block 605, a spreading block 609, a modulator 108, a mixer 507, a modulation characteristic selection block 624, an on/off state block 402, and the radiation device 112. The figure is an example of a highly secure communication device wherein interception and decoding of the broadcast RF signal would be very difficult. In this embodiment, the data stream is modulated onto the carrier wave and additionally controls three modulation characteristics. In addition, the device 600 includes various preprocessing blocks.

The encryption block 601 may encrypt the data stream according to any known encryption algorithm. The FEC block 602 performs a forward error correction algorithm on the encrypted data stream and may add error correction/detection bits to the data stream. The interleaver block 605 may shuffle the sections of the data stream according to a predetermined interleaving algorithm. The spreading block 609 spreads the data stream over time, as controlled by the data stream. The modulator 108 modulates the data stream onto a basic carrier wave frequency. The modulation may additionally be controlled by the data stream and the modulation characteristics selection block 624. The control of data modulation onto a carrier wave may be performed in addition to the on/off carrier wave state control. Therefore, the device 600 may output both a data modulated carrier wave and a pure carrier wave. The mixer 507 modulates the modulated basic carrier wave frequency with a selected component frequency in order to create and output a selected carrier wave frequency. The on/off state block 402 controls the on/off state of the carrier wave according to a selected on/off state. The modulation characteristics block 624 receives the data stream and selects the output carrier wave frequency and selects the carrier wave on/off state. In addition, the modulation characteristics block 624 may select the spreading pattern and may control a data modulation onto a carrier wave.

As previously discussed, although the communication device is depicted as a transmitter, it may also be a receiver device and the data stream generator 103 may be used to control the characteristics of the detection and/or demodulation of a received RF signal.

Therefore, the various communication device embodiments of the invention implement an RF modulation method. The modulation method includes providing a radio frequency modulator capable of modulating or demodulating a radio frequency signal, providing a data stream, and controlling one or more modulation characteristics according to the data stream. The data stream may optionally be modulated onto a carrier wave and may be demodulated from a carrier wave while controlling one or more modulation characteristics according to the data stream. The controlling step may comprise selecting a carrier wave frequency modulation characteristic, selecting a carrier wave spreading pattern modulation characteristic, selecting a carrier wave on/off state modulation characteristic, or selecting various combinations of the above modulation characteristics.

While the invention has been described in detail above, the invention is not intended to be limited to the specific embodiments as described. It is evident that those skilled in the art may now make numerous uses and modifications of and departures from the specific embodiments described herein without departing from the inventive concepts.

What is claimed is:

1. A radio frequency communication device, comprising:
   a data source providing a data stream; and
   a radio frequency modulation device communicating with said data stream and performing a modulation of a carrier wave according to said data stream provided by said data source, with said data stream controlling one or more modulation characteristics of said carrier wave, wherein said data stream controls a carrier wave on/off state modulation characteristic;
   wherein said data stream further controls a frequency upon which the carrier wave is transmitted according to frequency hopping techniques, wherein the frequency upon which the carrier wave is transmitted corresponds to characteristics of the data stream.

2. The device of claim 1, wherein said radio frequency communication device comprises a direct sequence modulation device.

3. The device of claim 1, wherein said data stream is a randomized data stream.

4. The device of claim 1, wherein said data stream is an encrypted data stream.

5. The device of claim 1, wherein said data stream is an interleaved data stream.

6. The device of claim 1, wherein said data stream further controls a carrier wave spreading pattern modulation characteristic.

* * * * *